US009822866B2

(12) United States Patent
Mizuno et al.

(10) Patent No.: US 9,822,866 B2
(45) Date of Patent: Nov. 21, 2017

(54) TRANSMISSION OF INTERNAL COMBUSTION ENGINE

(71) Applicant: HONDA MOTOR CO., LTD., Tokyo (JP)

(72) Inventors: Kinya Mizuno, Wako (JP); Junji Konaka, Wako (JP); Yasushi Fujimoto, Wako (JP); Hiroyuki Makita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 14/666,597

(22) Filed: Mar. 24, 2015

(65) Prior Publication Data

US 2015/0276018 A1  Oct. 1, 2015

(30) Foreign Application Priority Data

Mar. 28, 2014  (JP) .................................. 2014-070051

(51) Int. Cl.
*F16H 57/021* (2012.01)
*F16H 57/038* (2012.01)
(Continued)

(52) U.S. Cl.
CPC ............. *F16H 57/021* (2013.01); *F16D 3/12* (2013.01); *F16D 21/06* (2013.01);
(Continued)

(58) Field of Classification Search
CPC . F16D 13/40; F16D 21/06; F16D 3/12; F16D 2021/0661; F16D 2021/0692; F16H 1/18; F16H 2057/0012; F16H 2057/02039; F16H 2057/02043; F16H 2057/02065; F16H 2057/02086; F16H 2057/126;
(Continued)

(56) References Cited

U.S. PATENT DOCUMENTS

| 4,912,998 A * | 4/1990 | Sugano ................. F16H 57/023 |
| | | 74/409 |
| 2002/0033062 A1* | 3/2002 | Obinata ................ F16H 57/021 |
| | | 74/410 |

(Continued)

FOREIGN PATENT DOCUMENTS

JP  2007-078086 A  3/2007

*Primary Examiner* — William C Joyce
*Assistant Examiner* — Joseph Brown
(74) *Attorney, Agent, or Firm* — Birch, Stewart, Kolasch & Birch, LLP

(57) ABSTRACT

A transmission of an internal combustion engine in which the shaft length of a main shaft can be shortened to eliminate a supporting wall around a reduction gear while a thrust load is received. Around a main shaft of a transmission of an internal combustion engine, a primary bearing is fastened to an inside of a primary driven gear, and is disposed between the primary driven gear and the main shaft. A collar member is disposed between the primary bearing and a main bearing. A step portion, in contact with the main bearing, is formed on the main shaft on an opposite side of the main bearing from the collar member. A cylindrical portion, an inner race of the primary bearing, the collar member, and an inner race of the main bearing are fastened to the side of the step portion.

7 Claims, 2 Drawing Sheets

(51) Int. Cl.
  *F16H 57/00* (2012.01)
  *F16H 57/04* (2010.01)
  *F16D 3/12* (2006.01)
  *F16D 21/06* (2006.01)
  *F16H 57/02* (2012.01)
  *F16H 3/00* (2006.01)

(52) U.S. Cl.
  CPC ....... *F16H 57/0006* (2013.01); *F16H 57/038* (2013.01); *F16H 57/0436* (2013.01); *F16D 2021/0661* (2013.01); *F16D 2021/0692* (2013.01); *F16D 2300/12* (2013.01); *F16H 3/006* (2013.01); *F16H 2057/0012* (2013.01); *F16H 2057/02065* (2013.01); *Y10T 74/19614* (2015.01)

(58) Field of Classification Search
  CPC ........... F16H 2057/127; F16H 57/0006; F16H 57/0436; F16H 57/0037; F16H 57/02; F16H 57/021; F16H 57/022; F16H 57/12; F16H 3/006; F16H 3/089; B60K 17/00–17/08
  See application file for complete search history.

(56) References Cited

U.S. PATENT DOCUMENTS

| | | | |
|---|---|---|---|
| 2008/0087119 A1* | 4/2008 | Shiozaki | F16D 25/10 74/330 |
| 2010/0075763 A1* | 3/2010 | Yoshimura | F16F 15/1214 464/68.41 |
| 2012/0239264 A1* | 9/2012 | Kojima | F16H 61/16 701/53 |
| 2012/0298466 A1* | 11/2012 | Nedachi | F16D 48/06 192/84.6 |
| 2013/0042709 A1* | 2/2013 | Li | F16H 3/095 74/331 |
| 2013/0055841 A1* | 3/2013 | Nakamura | B62M 25/06 74/473.16 |

* cited by examiner

TRANSMISSION OF INTERNAL COMBUSTION ENGINE

CROSS-REFERENCE TO RELATED APPLICATIONS

The present application claims priority under 35 USC 119 to Japanese Patent Application No. 2014-070051 filed Mar. 28, 2014 the entire contents of which are hereby incorporated by reference.

BACKGROUND OF THE INVENTION

1. Field of the Invention

The present invention relates to a transmission of an internal combustion engine. More particularly, to a transmission of an internal combustion engine applied to a motorcycle.

2. Description of Background Art

Japanese Patent Laid-Open No. 2007-78086, for example, discloses a transmission for an internal combustion engine structure that includes a primary reduction gear for the transmission. More specifically, Japanese Patent Laid-Open No. 2007-78086 discloses a primary drive gear provided relative to a crankshaft wherein a primary driven gear is driven by the primary drive gear. A reduction gear bearing is provided between the primary driven gear and a clutch outer. A wall portion of a power unit case supports the reduction gear bearing. A clutch center is rotated by receiving power from the clutch outer. A main shaft rotates integrally with the clutch center.

In the structure described in Japanese Patent Laid-Open No. 2007-78086, though not disclosed in detail in the conventional example, the primary drive gear and the primary driven gear are helical gears. Thus, when the crankshaft rotates, the primary driven gear receives a thrust load to the clutch side. Because the thrust load is received, the above-described reduction gear bearing and the wall portion of the power unit case for supporting the reduction gear bearing are set in the conventional example. Therefore, the conventional example has a problem of a long shaft length of the transmission main shaft provided with the clutch.

SUMMARY AND OBJECTS OF THE PRESENT INVENTION

The present invention has been made in view of the above-described situation. It is an object of an embodiment of the present invention to provide a transmission of an internal combustion engine in which a thrust load is generated between a primary drive gear and a primary driven gear. Thus, the shaft length of a main shaft can be shortened by getting rid of a supporting wall around a reduction gear while a thrust load is received.

According to an embodiment of the present invention, there is provided a transmission of an internal combustion engine, the transmission including:

a primary driven gear that meshes with a primary drive gear provided on a crankshaft side of the engine, and is provided so as to be rotatable on a main shaft of the transmission;

a clutch including a clutch outer rotating integrally with the primary driven gear and a clutch center that is provided so as to be rotatable relative to the clutch outer, rotates integrally with the main shaft, and is fastened in an axial direction by a fastening member;

a main bearing is provided between the main shaft and a transmission case wall portion, and is capable of transmitting a thrust load to the transmission case wall portion;

the primary drive gear and the primary driven gear are formed as helical gears;

around the main shaft, a primary bearing is fastened to an inside of the primary driven gear, and disposed between the primary driven gear and the main shaft, and a collar member is disposed between the primary bearing and the main bearing; and a step portion is in contact with the main bearing, the step portion being formed on the main shaft on an opposite side of the main bearing from the collar member;

a cylindrical portion of the clutch center, an inner race of the primary bearing, the collar member, and an inner race of the main bearing are fastened to a side of the step portion by fastening the fastening member.

According to an embodiment of the present invention, a damper spring is provided within the clutch center, the damper spring being disposed along a circumferential direction. A housing portion, for housing the damper spring, is a swelling portion swelling out to a side of the primary bearing. In addition, an intra-clutch collar member is provided around the main shaft and between the cylindrical portion of the clutch center and the primary bearing.

According to an embodiment of the present invention, a flange wall extending to an inside in a radial direction so as to abut against an end surface of the primary bearing, the end surface being on an opposite side from a side of the clutch, is provided to a bearing housing portion of the primary driven gear, the bearing housing portion housing the primary bearing.

According to an embodiment of the present invention, an oil pump drive sprocket, that rotates integrally with the primary driven gear and is capable of rotating relative to the collar member, is provided on the collar member.

According to an embodiment of the present invention, the fastening member for attaching the clutch center can fasten the primary bearing to the side of the step portion of the main shaft via the collar member and the main bearing. Thereby, the thrust load applied to the primary driven gear as a helical gear can be received by the main shaft supporting portion of the transmission case wall portion provided originally via the main bearing. As a result, a wall supporting a reduction gear bearing, which wall is conventionally provided between the primary driven gear and the clutch outer in the axial direction, can be excluded, so that the length of the main shaft around the primary reduction gear can be shortened.

According to an embodiment of the present invention, the intra-clutch collar member is provided between the cylindrical portion of the clutch center and the primary bearing. Thus, even with a structure in which the housing portion in which the spring damper is disposed is provided within the clutch center, the clutch center has the swelling portion on the side of the primary bearing. More specifically, even with a structure wherein an interval between the cylindrical portion of the clutch center and the primary bearing is increased, a fastening load in the axial direction by the fastening member can be transmitted to the primary bearing via the intra-clutch collar member. In addition, a fastening can be performed between the fastening member and the step portion.

According to an embodiment of the present invention, the flange wall, extending to the inside in the radial direction so as to abut against the end surface of the primary bearing, the end surface being on the opposite side from the clutch side, is provided to the bearing housing portion of the primary driven gear, the bearing housing portion housing the primary bearing. Therefore, the primary bearing can be pressed to the clutch side along the axial direction of the main shaft. Thus, the thrust load applied to the primary driven gear can be more surely transmitted to the side of the primary bearing.

According to an embodiment of the present invention, the oil pump drive sprocket, that rotates integrally with the primary driven gear and is capable of rotating relative to the collar member, is provided on the collar member. Thus, the oil pump drive sprocket can be compactly disposed in a narrow space between the primary bearing and the main bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
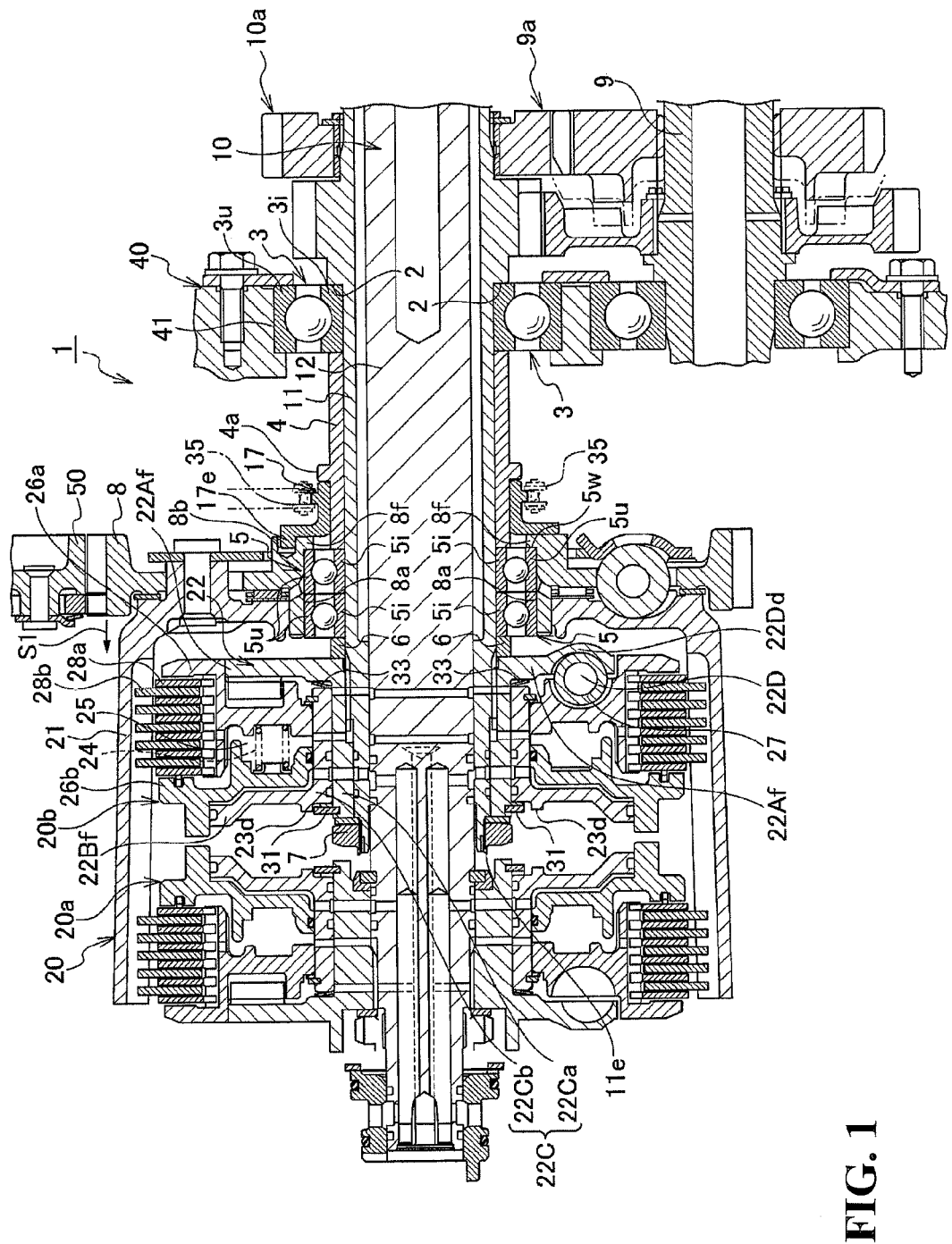
FIG. 1 is a fragmentary sectional view of a transmission of an internal combustion engine according to the present invention.

A transmission of an internal combustion engine according to an embodiment of the present invention will be described with reference to FIG. 1 and FIG. 2. Wording such as "up," "down," "left," and "right" in the description of the figures is set forth when the drawings are viewed in the orientation of reference symbols in the drawings.

The transmission 1 shown in FIG. 1 is a transmission 1 of a so-called twin clutch type which transmission is provided in a motorcycle, for example. A clutch 20 is provided on a main shaft 10 to which an engine output from the crankshaft side of an engine (not shown) is transmitted (the clutch 20 being provided on a left side in the figure). More specifically, a primary driven gear 8, meshing with a primary drive gear 50 that transmits the engine output, is provided on the main shaft 10 of the transmission 1, and the clutch 20 includes a first clutch 20a and a second clutch 20b that can be engaged with and disengaged from a clutch outer 21.

In addition, though not shown in detail, the primary drive gear 50 and the primary driven gear 8 are formed as helical gears. Thus, the engagement of the primary drive gear 50 and the primary driven gear 8 with each other causes a thrust load to the clutch side to be generated on the primary driven gear 8, as indicated by an arrow S1 in FIG. 1.

In addition, a drive gear train 10a is provided around the main shaft 10 on an opposite side from a side where the clutch 20 is provided. A driven gear train 9a capable of meshing with the drive gear train 10a is provided to a counter shaft 9 disposed in parallel with the main shaft 10.

The clutch 20 for example has a structure of a twin clutch type in which the first clutch 20a that can be engaged with and disengaged from an inner shaft 12 of the main shaft 10 and the second clutch 20b that can be engaged with and disengaged from an outer shaft 11 of the main shaft 10 are housed within the clutch outer 21 rotating integrally with the primary driven gear 8.

Clutch plates 28a and clutch disks 28b are alternately arranged in an axial direction between pressure plates 26a and 26b to connect and disconnect the transmission of power. The pressure plates 26a and 26b are retained by a clutch center 22. More specifically, the cylindrical portion 22C of the clutch center 22 has an inside cylindrical portion 22Ca and an outside cylindrical portion 22Cb, which are arranged around the axis of the main shaft 10 so as to be superposed in a radial direction. The cylindrical portion 22C also has support flanges 22Af and 22Bf extending out from both end portions of the cylindrical portion 22C (22Ca and 22Cb) to the outside in the radial direction. The support flanges 22Af and 22Bf and the cylindrical portion 22C retain the pressure plates 26a and 26b. In addition, a return spring 24 is provided within a hydraulic chamber 25 between the pressure plates 26a and 26b.

In addition, a damper spring 27, disposed along a circumferential direction, is provided within the clutch center 22. Thus, the clutch center 22 is provided with a housing portion 22D for housing the damper spring 27. The housing portion 22D needs a large space in the axial direction, and forms a swelling portion 22Dd swelling out to the side of a primary bearing 5.

The primary bearing 5 for rotatably supporting the primary driven gear 8 on the main shaft 10 is provided between the primary driven gear 8 and the main shaft 10. In the present embodiment, the primary bearing 5 is provided as a pair of ball bearings arranged in a left-right direction, for example. Thus, the primary driven gear 8 is rotatably attached around the axis of the main shaft 10 by the ball bearings, which have balls 5b between outer races 5u and inner races 5i. The primary bearing 5 is press-fitted into a bearing housing portion 8a on the inside of the primary driven gear 8. More specifically, the outer races 5u of the primary bearing 5 are press-fitted into and securely fastened to the inner wall surface of the bearing housing portion 8a.

A flange wall 8f extended circumferentially to the inner side of a shaft diameter is provided to the bearing housing portion 8a on one end side in the axial direction of the bearing housing portion 8a (opposite side from the clutch). Thus, the flange wall 8f has a structure that projects in such a manner so as to be contactable with a side end surface 5w of the outer race 5u of the primary bearing 5 press-fitted within the bearing housing portion 8a. The flange wall 8f can therefore press the primary bearing 5 to the side of the clutch 20 along the axial direction of the main shaft 10. Thereby, the primary bearing 5 surely transmits the thrust load that the primary driven gear 8 receives from the primary drive gear 50.

The following description will be made of members arranged around the main shaft 10 on the opposite side of the primary bearing 5 from the clutch 20, or in other words on the right side of the primary bearing 5 in FIG. 1 and FIG. 2.

First, a collar member 4, in contact with the primary bearing 5, is provided on the opposite side of the primary bearing 5 from the clutch 20. An external surface rib 4a that projects in a circumferential direction is formed on the outer circumferential surface of the collar member 4. The external surface rib 4a projects so as to regulate the position in the axial direction of an oil pump drive sprocket 17 between the external surface rib 4a and the primary driven gear 8. The oil pump drive sprocket 17 is formed so as to have a substantially L-shaped cross section. A large-diameter end portion 17e that rises from the external surface of the collar member 4 to the outside is formed on one end side (left side in the figures) of the oil pump drive sprocket 17. The large-diameter end portion 17e is engaged with an engaging recessed portion 8b provided in a side wall on an inner circumference side of the primary driven gear 8 (provided immediately outwardly of the flange wall 8f in the present embodiment). Because of this engagement, the oil pump drive sprocket 17 rotates integrally with the primary driven gear 8. In addition, a chain 35 is stretched on a tooth portion provided on an opposite side from the large-diameter end portion 17e (right side in the figures), whereby an oil pump not shown in the figures is driven via the chain 35.

In addition, a main bearing 3 for rotatably supporting the main shaft 10 on a transmission case wall portion 40 is provided such that the collar member 4 is interposed between the main bearing 3 and the primary bearing 5 and such that the main bearing 3 is in contact with one end side (right side in the figures) of the collar member 4 on the opposite side from the primary bearing 5. The main bearing 3 is disposed between the main shaft 10 and the transmission case wall portion 40. In addition, the main bearing 3 is provided as a ball bearing that has balls 3b between an outer race 3u and an inner race 3i. The position of the main bearing 3 is regulated by contacting with a step portion 2 formed so as to have a large diameter on the opposite side from the collar member 4. More specifically, the outer race 3u of the main bearing 3 is received on the clutch side by a step portion 42 formed in a main shaft supporting portion 41 of the transmission case wall portion 40 which main shaft supporting portion 41 is around the main shaft 10. Meanwhile, the inner race 3i of the main bearing 3 receives the step portion 2.

The following description will be made of members arranged around the main shaft 10 on the clutch 20 side of the primary bearing 5, more specifically, on the left side of the primary bearing 5 in FIG. 1 and FIG. 2.

An intra-clutch collar member 6 is provided next to the primary bearing 5 such that one end portion (right side end portion in the figures) of the intra-clutch collar member 6 is in contact with the primary bearing 5. Another end portion (left side end portion in the figures) of the intra-clutch collar member 6 is disposed so as to be in contact with one end portion 22Ch (right side end portion in the figures) of the cylindrical portion 22C of the clutch center 22.

In addition, a fastening member 7 formed by a nut, for example, which regulates the position of another end portion 22Ci (left side end portion in the figures) of the cylindrical portion 22C of the clutch center 22, is fastened to a shaft end portion 11e (shaft end portion of the outer shaft 11 in the present embodiment).

Thus, in the present embodiment, by fastening the fastening member 7, the inner race 3i of the main bearing 3, the collar member 4, the inner race 5i of the primary bearing 5, the intra-clutch collar member 6, and the inside cylindrical portion 22Ca of the cylindrical portion 22C are fastened in a state of being aligned with each other in the axial direction between the step portion 2 and the fastening member 7.

Description will be made of the action of the present embodiment, that is, a manner in which the thrust load applied to the primary driven gear is received by the transmission case.

As mentioned above, the primary drive gear 50 and the primary driven gear 8 are formed as helical gears. Thus, the engagement of the primary drive gear 50 and the primary driven gear 8 with each other causes a thrust load to the clutch side to be generated on the primary driven gear 8 (arrow S1 in FIG. 1 and FIG. 2). The thrust load S1 is transmitted to the outer races 5u of the primary bearing 5 press-fitted in the bearing housing portion 8a on the inside of the primary driven gear 8, and is transmitted to the inner races 5i via the balls 5b (thrust load S2 in FIG. 2). The fastening member 7 fastens the inner races 5i of the primary bearing 5, the intra-clutch collar member 6, the inside cylindrical portion 22Ca of the clutch center 22, the collar member 4, and the inner race 3i of the main bearing 3 to the side of the step portion 2 of the main shaft 10 (outer shaft 11). Therefore, the thrust load S2 transmitted to the inner races 5i of the primary bearing 5 is applied to the inner race 3i of the main bearing 3 (thrust load S3 in FIG. 2). The thrust load S3 is transmitted to the outer race 3u via the balls 3b of the main bearing 3 (thrust load S4 in FIG. 2), and is received by the step portion 42 formed in the main shaft supporting portion 41 of the transmission case wall portion 40.

In the present embodiment, as mentioned above, the fastening member 7 for attaching the clutch center 22 can fasten the primary bearing 5 to the side of the step portion 2 of the main shaft 10 via the collar member 4 and the main bearing 3. Thereby, the thrust load applied to the primary driven gear 8 as a helical gear can be transmitted to the side of the main bearing 3. Thus, the main shaft supporting portion 41 of the transmission case wall portion 40 provided originally, for example, can receive the thrust load applied to the primary driven gear 8. As a result, a wall supporting a reduction gear bearing, which wall is conventionally provided between the primary driven gear 8 and the clutch outer 21 in the axial direction, can be eliminated, so that the length of the main shaft 10 around the primary reduction gear can be shortened.

In addition, in the present embodiment, the intra-clutch collar member 6 is provided between the cylindrical portion 22C of the clutch center 22 and the primary bearing 5. Thus, for example, even with a structure in which the swelling portion 22Dd of the housing portion 22D for housing the damper spring 27 within the clutch center 22 swells out to the side of the primary bearing 5, that is, even with a structure in which an interval between the cylindrical portion 22C of the clutch center 22 and the primary bearing 5 is increased, a fastening load in the axial direction by the fastening member 7 can be transmitted to the primary bearing 5 via the intra-clutch collar member 6. Thus, a fastening can be performed without any gap between the fastening member 7 and the step portion 2.

In addition, in the present embodiment, the flange wall 8f, extending to the inside in the radial direction so as to face one end surface of the primary bearing 5 which end surface is on the opposite side from the side of the clutch 20, is provided to the bearing housing portion 8a of the primary driven gear 8 which bearing housing portion 8a houses the primary bearing 5. According to this structure, the primary bearing 5 can be pressed to the side of the clutch 20 along the axial direction of the main shaft 10. Thus, the thrust load applied to the primary driven gear 8 can be more surely transmitted to the side of the primary bearing 5.

Further, in the present embodiment, the oil pump drive sprocket 17 that rotates integrally with the primary driven gear 8 and which can rotate relative to the collar member 4 is provided on the collar member 4. According to this structure, the oil pump drive sprocket 17 can be compactly disposed in a narrow space between the primary bearing 5 and the main bearing 3.

Figure 2:
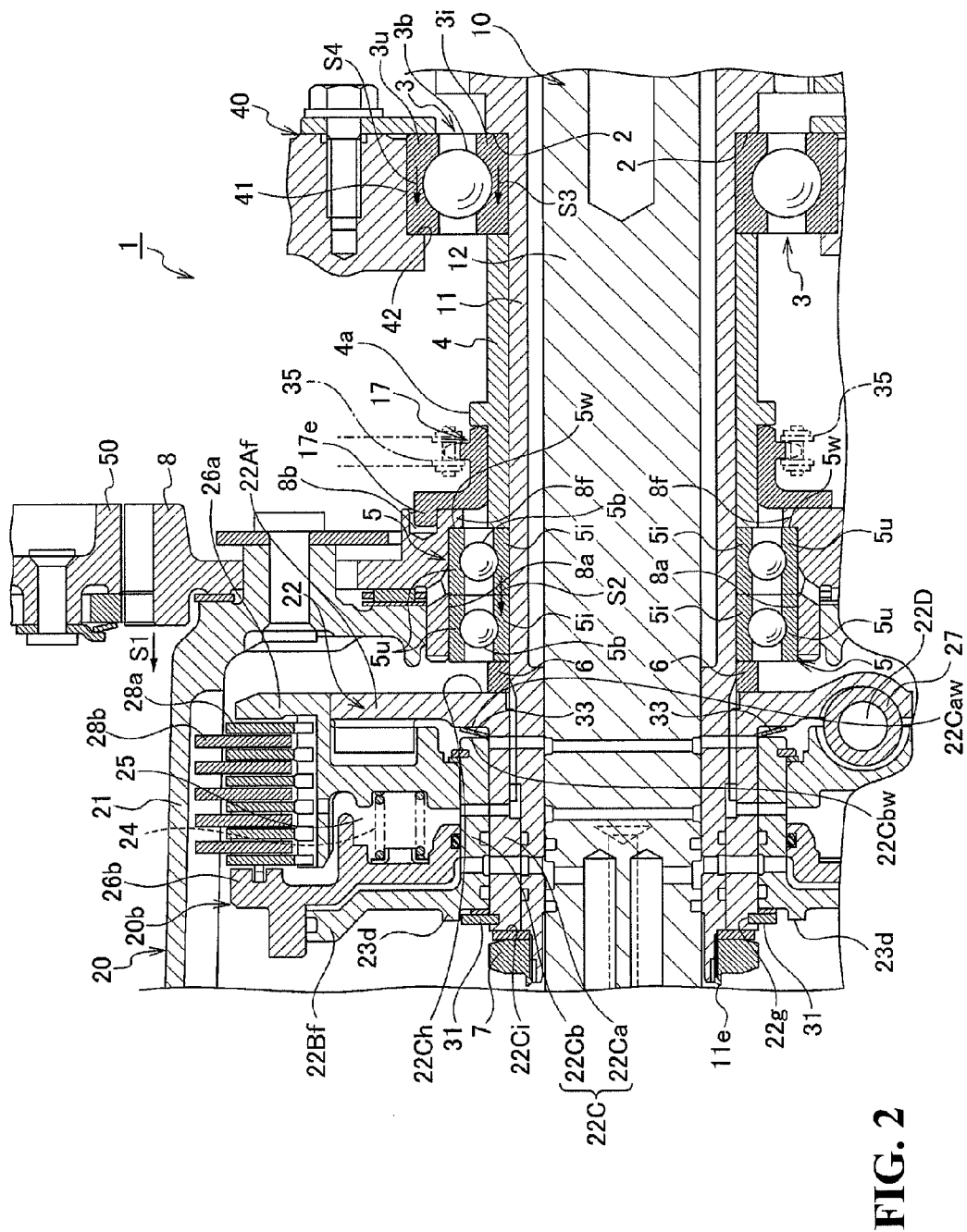
FIG. 2 is a sectional view showing, in enlarged dimension, a part of the transmission shown in FIG. 1.

In addition, as shown in an enlarged dimension in FIG. 2, in an outer circumferential surface on one end side (left side in the figure) of the inside cylindrical portion 22Ca of the cylindrical portion 22C, a groove 22g is formed along the circumference. A retaining ring 31 is fitted into the groove 22g. Hence, the retaining ring 31 stops the outside cylindrical portion 22Cb of the clutch center 22 so as to prevent the outside cylindrical portion 22Cb from coming off in the direction of an axial end (left direction in the figure). In addition, a projecting portion 23d is formed on an outside surface of the support flange 22Bf of the outside cylindrical portion 22Cb at an inward position in the radial direction of the support flange 22Bf. This projecting portion 23d projects immediately outwardly of the retaining ring 31 in the radial direction for preventing the retaining ring 31 from coming off.

In addition, a disc spring 33 is disposed between an inside wall surface 22Caw of the inside cylindrical portion 22Ca and an end wall surface 22Cbw of the outside cylindrical portion 22Cb. This disc spring 33 can produce a moderate frictional force between the inside cylindrical portion 22Ca and the outside cylindrical portion 22Cb in the clutch center 22.

One embodiment of the present invention has been described above. However, the present invention is not limited to this embodiment, but can be changed as appropriate. For example, in the foregoing embodiment, the present invention is applied to a transmission of a twin clutch type, but is not limited to this. In addition, in the foregoing embodiment, ball bearings are used as bearings in the present invention. However, the bearings in the present invention are not limited to the ball bearings at all, but various bearings can be used as bearings in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission of an internal combustion engine, the transmission comprising:
   a primary driven gear for meshing with a primary drive gear mounted on a crankshaft side of an engine, said primary driven gear being rotatable on a main shaft of the transmission;
   a clutch including a clutch outer rotating integrally with the primary driven gear and a clutch center selectively rotatable relative to the clutch outer, said clutch center rotates integrally with the main shaft and is fastened in an axial direction by a fastening member;
   a main bearing mounted between the main shaft and a transmission case wall portion, said main bearing including an inner race having an inner side surface and an outer side surface and said main bearing transmitting a thrust load to the transmission case wall portion;
   the primary drive gear and the primary driven gear being formed as helical gears;
   around the main shaft:
      a primary bearing is fastened to an inside of the primary driven gear, and is disposed between the primary driven gear and the main shaft, said primary bearing including an inner race having an inner side surface and an outer side surface with balls of the primary bearing being disposed between the inner race and an outer race of the primary bearing, and said primary bearing being housed in a bearing housing portion on the inside of the primary driven gear by inserting the outer race into an inner wall surface of the bearing housing portion; and
      a collar member is positioned around the main shaft and between the inner side surface of the inner race of the primary bearing and the outer side surface of the inner race of the main bearing;
      a step portion formed on an outer shaft wherein the inner side surface of the inner race of the main bearing is in contact with the step portion;
      a cylindrical portion of the clutch center is aligned with the outer side surface of the inner race of the primary bearing being aligned with the collar member, the collar member is positioned around the main shaft and in engagement with the inner side surface of the inner race of the primary bearing and in engagement with the outer side surface of the inner race of the main bearing wherein the cylindrical portion of the clutch center, the inner race of the primary bearing, the collar member and the inner race of the main bearing are aligned adjacent to each other and are fastened to the step portion formed on the outer shaft by fastening the fastening member; and
      a flange wall extended to an inner side of a shaft diameter is provided on the bearing housing portion, said flange wall extending from the inner wall surface of the bearing housing portion to an inside in a radial direction so as to abut against an inner side surface of the outer race of the primary bearing, the inner side surface of the outer race of the primary bearing being on an opposite side from a side of the clutch.

2. The transmission of the internal combustion engine according to claim 1, wherein:
   a damper spring mounted within the clutch center, the damper spring being disposed along a circumferential direction;
   a housing portion for housing the damper spring is a swelling portion swelling out to a side of the primary bearing; and
   an intra-clutch collar member is mounted around the main shaft on a side of the clutch center where the swelling portion is disposed.

3. The transmission of the internal combustion engine according to claim 2, wherein an oil pump drive sprocket includes a substantially L-shaped cross section with a large-diameter end portion for engaging a recessed portion in the primary driven gear for rotating the oil pump drive sprocket integrally with the primary driven gear, said oil pump drive sprocket being in engagement with a rib projecting from the collar member to prevent axial displacement and being rotatable relative to the collar member.

4. The transmission of the internal combustion engine according to claim 1, wherein an oil pump drive sprocket is mounted on the collar member, said oil pump drive sprocket being rotated integrally with the primary driven gear, said oil pump drive sprocket being rotatable relative to the collar member.

5. A transmission of an internal combustion engine, comprising:
   a helical primary driven gear for meshing with a helical primary drive gear mounted on a crankshaft side of an engine, said primary driven gear being rotatable on a main shaft of the transmission;

a clutch including an outer rotating integrally with the primary driven gear and a clutch center selectively rotatable relative to the clutch outer, said clutch center rotates integrally with the main shaft and is fastened in an axial direction by a fastening member;

a main bearing mounted between the main shaft and a transmission case wall portion, said main bearing including an inner race having an inner side surface and an outer side surface and said main bearing transmitting a thrust load to the transmission case wall portion;

a primary bearing is fastened to an inside of the primary driven gear, and is disposed between the primary driven gear and the main shaft, said primary bearing including an inner race having an inner side surface and an outer side surface with balls of the primary bearing being disposed between the inner race and an outer race of the primary bearing, and said primary bearing being housed in a bearing housing portion on the inside of the primary driven gear by inserting the outer race into an inner wall surface of the bearing housing portion;

a collar member is positioned around the main shaft and between the inner side surface of the inner race of the primary bearing and the outer side surface of the inner race of the main bearing;

a step portion formed on an outer shaft wherein the inner side surface of the inner race of the main bearing is in contact with the step portion;

a cylindrical portion of the clutch center is aligned with the outer side surface of the inner race of the primary bearing being aligned with the collar member, the collar member is positioned around the main shaft and in engagement with the inner side surface of the inner race of the primary bearing and in engagement with the outer side surface of the inner race of the main bearing wherein the cylindrical portion of the clutch center, the inner race of the primary bearing, the collar member and the inner race of the main bearing are aligned adjacent to each other and are fastened to the step portion formed on the outer shaft by fastening the fastening member;

an oil pump drive sprocket having a substantially L-shaped cross section with a large-diameter end portion for engaging a recessed portion in the primary driven gear for rotating the oil pump drive sprocket integrally with the primary driven gear, said oil pump drive sprocket being in engagement with a rib projecting from the collar member to prevent axial displacement and being rotatable relative to the collar member; and a flange wall extended to an inner side of a shaft diameter is provided on the bearing housing portion, said flange wall extending from the inner wall surface of the bearing housing portion to an inside in a radial direction so as to abut against an inner side surface of the outer race of the primary bearing, the inner side surface of the outer race of the primary bearing being on an opposite side from a side of the clutch.

6. The transmission of the internal combustion engine according to claim 5, wherein:

a damper spring mounted within the clutch center, the damper spring being disposed along a circumferential direction;

a housing portion for housing the damper spring is a swelling portion swelling out to a side of the primary bearing; and an intra-clutch collar member is mounted around the main shaft on a side of the clutch center where the swelling portion is disposed.

7. A transmission of an internal combustion engine, the transmission comprising:

a primary driven gear for meshing with a primary drive gear mounted on a crankshaft side of an engine, said primary driven gear being rotatable on a main shaft of the transmission;

a clutch including a clutch outer rotating integrally with the primary driven gear and a clutch center selectively rotatable relative to the clutch outer, said clutch center rotates integrally with the main shaft and is fastened in an axial direction by a fastening member;

a main bearing mounted between the main shaft and a transmission case wall portion, said main bearing including an inner race having an inner side surface and an outer side surface and said main bearing transmitting a thrust load to the transmission case wall portion;

the primary drive gear and the primary driven gear being formed as helical gears;

around the main shaft:

a primary bearing is fastened to an inside of the primary driven gear, and is disposed between the primary driven gear and the main shaft, said primary bearing including an inner race having an inner side surface and an outer side surface;

a collar member is positioned around the main shaft and between the inner side surface of the inner race of the primary bearing and the outer side surface of the inner race of the main bearing;

a step portion formed on an outer shaft wherein the inner side surface of the inner race of the main bearing is in contact with the step portion;

a cylindrical portion of the clutch center is aligned with the outer side surface of the inner race of the primary bearing being aligned with the collar member, the collar member is positioned around the main shaft and in engagement with the inner side surface of the inner race of the primary bearing and in engagement with the outer side surface of the inner race of the main bearing wherein the cylindrical portion of the clutch center, the inner race of the primary bearing, the collar member and the inner race of the main bearing are aligned adjacent to each other and are fastened to the step portion formed on the outer shaft by fastening the fastening member;

a damper spring mounted within the clutch center, the damper spring being disposed along a circumferential direction;

a housing portion for housing the damper spring is a swelling portion swelling out to a side of the primary bearing;

an intra-clutch collar member is mounted around the main shaft on a side of the clutch center where the swelling portion is disposed; and a flange wall extended to an inner side of a shaft diameter is provided on the bearing housing portion, said flange wall extending from the inner wall surface of the bearing housing portion to an inside in a radial direction so as to abut against an inner side surface of the outer race of the primary bearing, the inner side surface of the outer race of the primary bearing being on an opposite side from a side of the clutch.

* * * * *